Aug. 15, 1967   C. H. VORPAHL   3,335,948
WHEEL ALIGNMENT COMPUTER
Filed Sept. 27, 1965   2 Sheets-Sheet 2
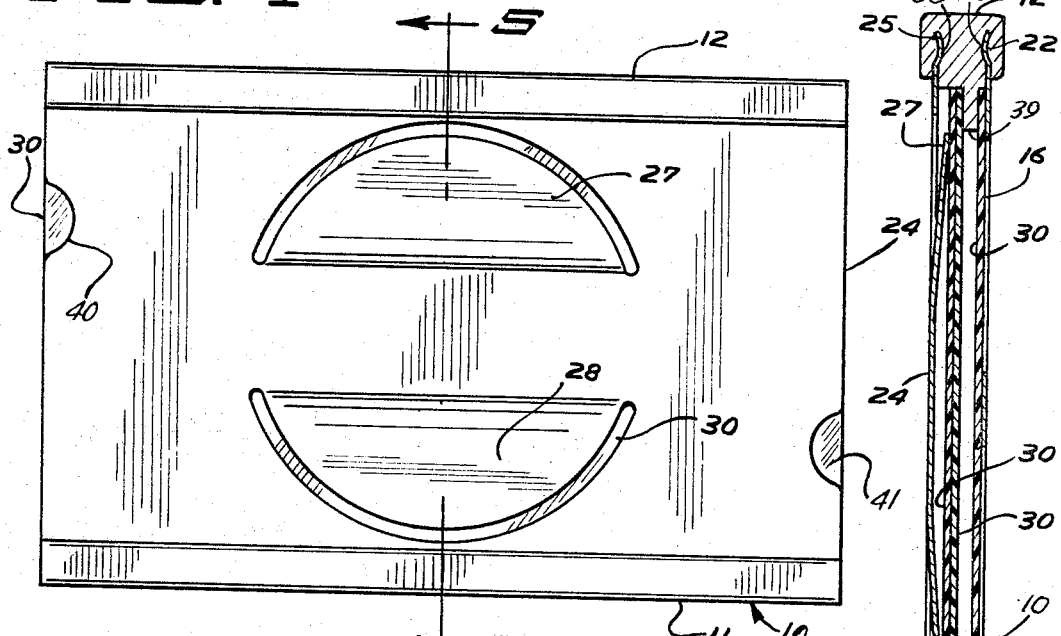
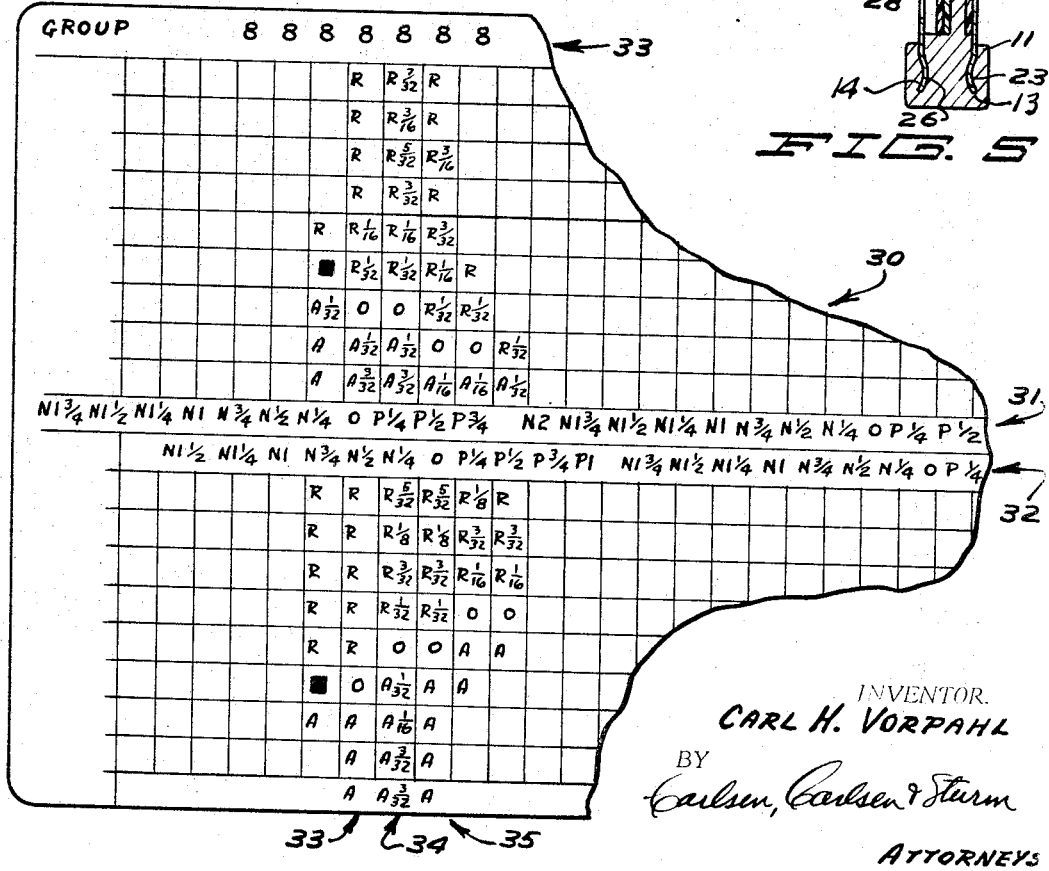
INVENTOR.
CARL H. VORPAHL
BY
Carlsen, Carlsen & Sturm
ATTORNEYS

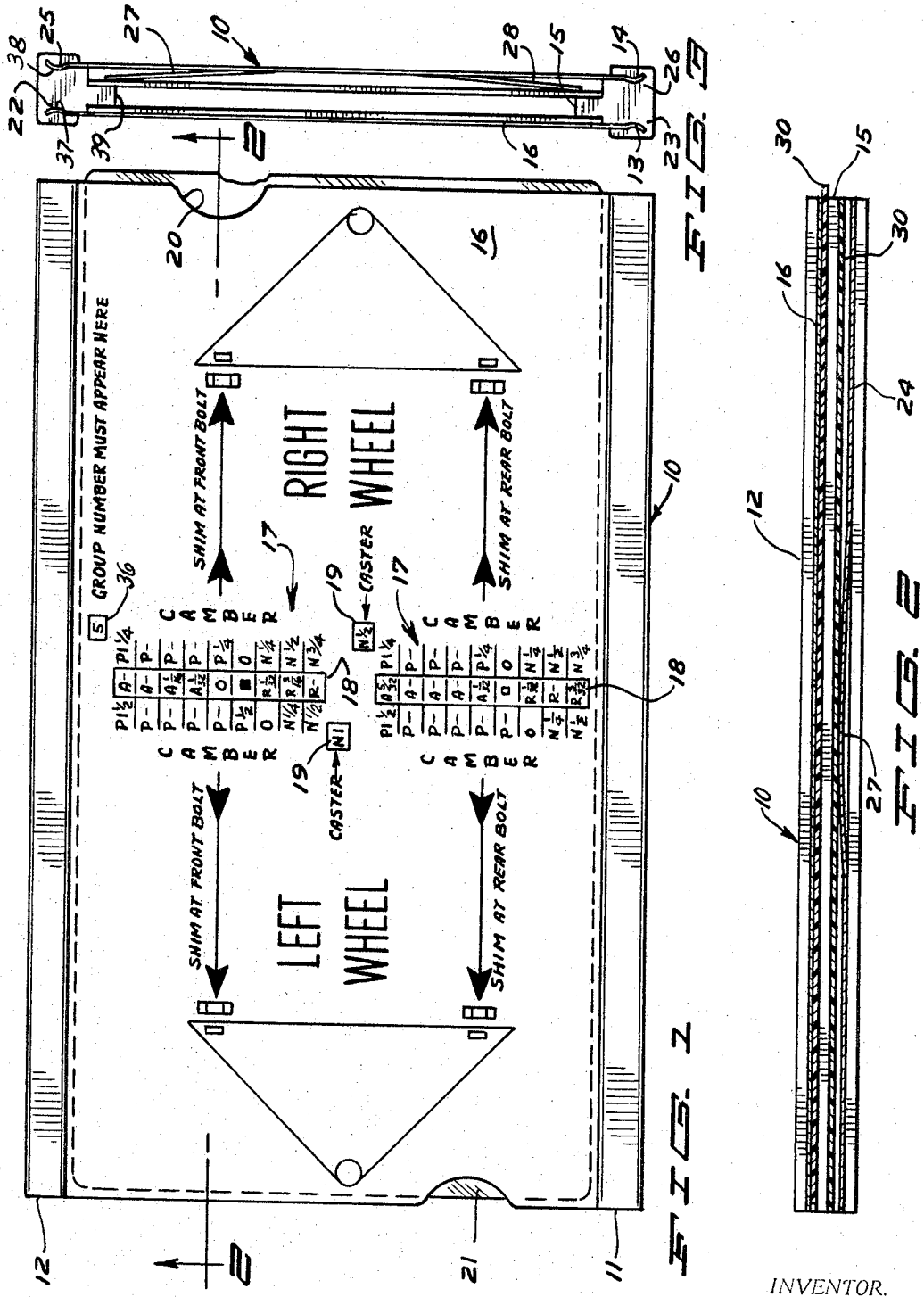

United States Patent Office 3,335,948
Patented Aug. 15, 1967

3,335,948
WHEEL ALIGNMENT COMPUTER
Carl H. Vorpahl, Minnetonka, Minn., assignor to Bishman Manufacturing Company, Osseo, Minn., a corporation of Minnesota
Filed Sept. 27, 1965, Ser. No. 490,535
5 Claims. (Cl. 235—89)

ABSTRACT OF THE DISCLOSURE

This invention relates generally to computers and is more particularly directed to slide rule computers for correlating two related variables representing the camber and caster of a steerable wheel on a vehicle, which may deviate from a predetermined desired value, to obtain the values of related correction factors which, if properly applied to the supporting apparatus for a steerable wheel on a vehicle, correct for any deviations of the two related variables from a desired predetermined value.

---

In the prior art with which my invention is concerned, the alignment of the steerable wheels of a vehicle with respect to camber and caster has been established as a requirement for the efficient operation of a vehicle. The prior art has developed numerous devices and apparatus for determining and measuring the camber and caster of a steerable wheel. Measurement of these two related and variable parameters may be accomplished through the use of any one of many of these devices and apparatus which may be attached to the steerable wheels of a vehicle. In calibrating and adjusting the steerable wheels of a vehicle for optimum efficient performance, the measurement of the camber and caster of the mounting apparatus for the steerable wheels provides first and second related variable quantities that must be resolved into correction factors which represent related values for accurately and rapidly adjusting the mounting for the steerable wheel so as to place it in an optimum operating disposition with respect to the vehicle upon which the steerable wheel is mounted so that, after adjustment, the steerable wheel is disposed in a proper, predetermined attitude of camber and caster with respect to the vehicle upon which it is mounted.

The prior art devices, apparatus and systems have proven to be slow and susceptible to inaccuracies which are detrimental to efficient alignment procedures. In certain devices the determination of the status of the camber and caster parameters of a steerable wheel on a vehicle has been used as a basis for computation utilizing suitable formulas for determining the values of correction factors to be used in adjusting the mounting mechanism for a steerable wheel. For example, the present day running gear on a vehicle for a steerable wheel may be adjusted by the insertion or removal of suitable shims that affect the attitude of the steerable wheel mounting apparatus. The determination of the values of the shims to be inserted by a formula has proven to be slow and inefficient and sometimes inaccurate. An alternative procedure has involved the use of complicated charts to which reference is made by correlating camber and caster readings for determining the values of the correction factors to be effected so as to suitably adjust the wheel mounting apparatus. In this last-named procedure, experience has shown that considerable error may arise in the use of such charts and the like.

As will be described in more detail below, my invention provides a computer in which a stationary frame assembly is provided with suitable indicia disposed in relation to windows, or openings therein, and which may be used in cooperation with a slidable card member having suitable indicia corresponding to one of the measured variable parameters and indicia disposed in relationship to such variable parameter and which may be used in combination with the other of said variable parameters to rapidly and accurately determine the value of a correction factor to be applied in adjusting the mounting apparatus for the steerable wheel of a vehicle. In utilizing my invention with suitable parameter measuring devices and apparatus, the first and second variable parameters, caster and camber, are determined and the values of the related correction factors to be applied to the mounting apparatus for a steerable wheel may readily by determined and executed. The values of the correction factors are such that no further measurement of the related first and second variable parameters, such as caster and camber, is necessary.

It may further be noted that I have provided an improved computer apparatus of the class generally referred to as slide rule computers in which one of a plurality of slidable members is disposed in operative relationship to a housing having suitable windows and indicia disposed thereon and the remainder of the plurality of slidable members are suitably retained in a disposition that will not interfere with the operation of the computer but which are readily available when it is desired to change the range of values of variable parameters and correction factors.

From the discussion set forth above and the description to be set forth below, it may be seen that one of the objectives of my invention is to provide an improved slide rule computer for determining the correction factor, in the form of thickness of shims to be inserted or removed from the running gear mounting apparatus of a vehicle to correctly calibrate and adjust the attitude of steerable wheels on a vehicle in accordance with predetermined attitudes of caster and camber. This is accomplished by providing a slide rule housing with a first opening relating to the measured caster of a steerable wheel and first and second openings calibrated for a range of the actual camber of a steerable wheel to indicate the values of adjustments to be applied at appropriate locations in the steerable wheel mounting apparatus. A slidable card, or the like, containing rows of indicia corresponding to the measured caster and columns of values corresponding to the correction required and disposed in predetermined relationship to the values of measured caster, may be slidably adjusted within the slide rule housing so that the measured caster parameter appears under the opening corresponding to caster and the value of the correction factor may be easily determined by reference to the measured camber of the steerable wheel within the range of calibrations provided on a scale adjacent the other openings in the slide rule housing whereby the value of the correction factor may be easily determined with very little likelihood of error and in a short time compared with present prior art devices and apparatus.

It is an object of my invention to provide an improved computer device for correlating a pair of related measured values to obtain a pair of related correction values.

A further object of my invention is to provide an improved slide rule computer for determining related correction values of adjustments to be effected in the mounting apparatus for steerable wheels on a vehicle.

A still further object of my invention is to provide an improved computer for determining the necessary adjustments to the steerable wheel mounting apparatus of a vehicle to correct for deviations in related camber and caster measurements.

A still further object of my invention is to provide an improved slide rule structure.

Another object of my invention is to provide an improved slide rule computer structure in which a plurality of indicia carrying slidable members may be utilized.

These and other objects of my invention will become apparent from a consideration of the appended specification, claims and drawings in which:

FIG. 1 is a front elevational view of a slide rule computer illustrating one embodiment of my invention;

FIG. 2 is a sectional view of FIG. 1 taken along section lines 2—2;

FIG. 3 is a side elevational view of the apparatus shown in FIG. 1;

FIG. 4 is a rear view of the apparatus shown in FIG. 1 on a slightly reduced scale;

FIG. 5 is an enlarged sectional view of the apparatus shown in FIG. 4 of the drawings taken along section line 5—5; and FIG. 6 is a partial broken away view illustrating the relationship of the indicia provided on the slidable card members which are used in the embodiments shown in FIGURES 1 to 5.

Referring to FIGURES 1 to 5, there is shown a frame member indicated generally by the reference character 10 that is adapted to slidably receive a plurality of suitably dimensioned card members 30.

Frame member 10 is shown comprised of a pair of longitudinally elongated laterally disposed side members 11 and 12. Side member 11 is shown having a pair of longitudinally extending grooves 13 and 14 and side member 12 is also shown having a like pair of grooves 37 and 38. The grooves are shown disposed to open inwardly toward the area intermediate the laterally disposed side members 11 and 12. Side members 11 and 12 are also shown having a longitudinally extending rib portion 15 and 39 respectively that is disposed intermediate the front and back thereof. Frame 10 also includes a front face member 16 having a pair of laterally elongated openings, or windows 18, each of which is provided with suitable indicia carrying scales 17 providing a range of values and disposed adjacent the laterally elongated windows as indicated by the legend, camber. Front face member 16 is also provided with a further pair of windows, or openings, 19 disposed in predetermined relationship with windows 18 and generally near the center intermediate the top and bottom edges thereof. Front face member 16 is also provided with suitable cut out openings 20 and 21 to provide for access to and slidable operation of a card 30 disposed therein. The top and bottom edges 22 and 23 of front face member 16 are shown disposed in cooperative supporting relation with grooves 37 and 13 in side members 12 and 11 respectively. It may be noted that front face member 16 is disposed forwardly of rib members 15 and 39 a sufficient distance to allow for the slidable insertion of one card 30, therebetween.

Frame 10 also includes a rear member 24 having top and bottom edges 25 and 26 disposed in supporting engagement with grooves 38 and 14 in side members 12 and 11 respectively. Rear face member 24 is disposed a substantial distance rearwardly of ribs 39 and 15 on side members 12 and 11 to slidably receive a plurality of indicia carrying card members 30. Rear face member 24 is also provided with suitable cut out portions 40 and 41 and is further provided with a pair of inwardly extending resilient semicircular ears 27 and 28 that extend toward rib portions 39 and 15 on side members 12 and 11 respectively. Resilient ears 27 and 28 are adapted to frictionally engage one or more of a plurality of card members 30 when disposed intermediate rib portions 39 and 15 and rear face member 24 to frictionally retain the same within frame 10.

One or more indicia carrying card members 30 may be slidably received in frame member 10 in one of the compartments defined therein. In FIG. 6 a portion of a complete indicia carrying card member 30 is shown wherein a row 33 of indicia is shown disposed along the top edge and two further rows of indicia 31 and 32 are shown disposed approximately intermediate the top and bottom edges of card 30. There is further shown a plurality of columns of indicia 33, 34 and 35 which are disposed intermediate rows 31 and 32 and the top and bottom edges of card 30. The range of values represented by the indicia in any given column is related to the disposition of the indicia disposed in the rows 31 or 32 whereby the first related variable represented by indicia in rows 31 and 32 may be correlated with the second related variable represented by the scale indicia 17 disposed adjacent windows 18 in frame 10 and the related correction values appearing in windows 18 will correspond to the first related variable appearing in window 19 and the computed value will be of the proper relationship with the first and second related variables. Card members 30 may be comprised of suitable plastic material, or the like, and the indicia applied thereto by suitable means. It is anticipated, as will be apparent to one skilled in the art, that each indicia carrying card member will be completely filled with rows of ranges of values corresponding to a first related variable and columns of ranges of values that are disposed on card 30 in predetermined relationship with the indicia representing the first related variable.

*Operation*

In one operative embodiment of the principles of my invention, a frame 10 was provided with the windows and indicia shown on FIG. 1 of the drawings as a computer designed to utilize first and second measured related variables representing the actual camber and caster of a steerable wheel on a vehicle. The scales 17 adjacent windows 18 in the front face 16 of frame 10 are provided with indicia representative of a range of values that the first variable, or camber, may ordinarily have and, in the embodiment shown, figures representing positive and negative increments of deviation from a predetermined desired attitude are shown on the right and left edges of windows 18. The cards 30 are suitably provided with rows 31 and 32 representing like ranges of measured values of a second variable, such as the caster of a steerable wheel on a vehicle, and again positive and negative departures from the desired attitude are indicated and in the embodiment shown, row 31 is to be used with the left front wheel on an automobile and row 32 is to be used with the right front wheel on an automobile. The desired columns of ranges of the values of correction factor adjustments to be used to place the steerable wheels in a desired predetermined attitude are disposed above and below rows 31 and 32 in a predetermined relationship. Further, in view of the fact that there are a number of different manufacturers of wheel supporting apparatus for the steerable wheels on a vehicle, the indicia that has been prepared and applied to the slidable card 30 may be arranged in groups, indicated by row 33 near the top edge of card 30 whereby all vehicles having steerable wheels and wheel supporting apparatus possessing common operative characteristics may be serviced and the classification, or group indicia, is disposed on card 30 in predetermined relationship with the range of values for the second related variable in rows 31 and 32.

In most wheel supporting apparatus in common use today, the insertion or removal of a predetermined thickness of shim material in the wheel supporting apparatus and at predetermined locations as might be represented by front and rear mounting bolts, will correct for measured deviations from the desired predetermined attitude of a steerable wheel. Thus, in operation, the first and second related variables representing the measured camber and caster of a steerable wheel are first determined by means well known to those skilled in the art which generally provides a representation of the attitude of a steerable wheel in terms of degrees or fractions of degrees.

Using the caster, or second measured related variable, and noting the classification indicator for the particular vehicle under consideration, slidable card 30 is moved longitudinally of frame 10 until the indicia corresponding to the measured value of the caster appears under window 19 and the desired group indicator likewise appears in window 36. At this time, columns of related correction factors corresponding to the second related variable, caster, will appear in windows 18. Then, using the measured value for the first related variable, the scales (assuming the left front wheel of a vehicle is under consideration) on the left side of windows 18 may be used to determine the related correction factors, shown in the form of amounts of material to be added or subtracted, by reading longitudinally of the measured first related variable on the scale adjacent windows 18. In the embodiment shown, the correction, or adjustment factor determined from top window 18 is utilized for modifying the thickness of the shim material in the front bolt of a wheel mounting apparatus and in similar manner, the correction factor obtained from lower window 18 is utilized to modify the thickness of the shim material at the rear bolt of the wheel supporting apparatus.

Further, in the embodiment shown above, the right wheel of a vehicle may be adjusted, if necessary, by utilizing right hand window 19 and the scales provided on the right edge of windows 18 in connection with the measured first and second related variables representing the camber and caster attitude of a steerable wheel and the required related correction factors utilized to adjust the wheel supporting apparatus so as to place the steerable wheel supported thereby in a desired predetermined attitude.

It may further be appreciated that frame 10 provides for the secure retention of a plurality of slidable card members 30 that are intended to be used one at a time as required by the computing operation to be effected. The unused cards are disposed intermediate ribs 39 and 15 on side members 12 and 11 and rear face member 24 and in engagement with the inwardly extending portions of resilient ears 27 and 28.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. Apparatus for converting first and second related variables representing relative values indicative of the camber and caster of a wheel to related correction values for adjusting the running apparatus of a vehicle comprising, in combination; an elongated hollow housing including a front face member having first, second and third windows disposed therein, at least one of said windows being laterally elongate with respect to the longitudinal axis of said hollow housing, at least one of said windows including a plurality of laterally disposed indicia corresponding to a range of values for said second variable and one of the other of said windows being adapted to locate a value corresponding to said first variable, said hollow housing further including a pair of laterally displaced longitudinally elongated members, each having a pair of grooves in supporting engagement with the top and bottom edges of the front and rear face members; and a card member dimensioned to be slidably disposed in said housing, said card member including a plurality of indicia arranged in rows across the center portion thereof, said indicia corresponding to a range of values for said first variable and having a plurality of columns of indicia, each of said columns of indicia representing a range of values of correction values to be used in adjusting the running apparatus of a vehicle and being disposed on said sliding card member in predetermined relationship with the rows of indicia corresponding to a range of values for said first variable.

2. The apparatus of claim 1 in which each of the elongated members has a longitudinally extending rib portion disposed intermediate the pair of grooves therein.

3. The apparatus of claim 2 in which the rear face member includes forwardly extending means for slidably engaging and retaining card members disposed intermediate the rear face member and the rib portions on said elongated members.

4. Related value computing apparatus comprising in combination a generally rectangular front face member; a generally rectangular rear face member; said front and rear face members being of the same size and including top and bottom edges, said front face member including a plurality of windows and indicia disposed in predetermined locations with respect to said windows; a top member including a pair of longitudinally extending grooves in engagement with the top edges of said front and rear face members and an inwardly extending raised portion disposed intermediate said front and rear face members; a bottom member of complementary shape including a pair of longitudinally extending grooves in engagement with the bottom edges of said front and rear face members and an inwardly extending portion disposed intermediate said face members; and an indicia carrying member slidably disposed intermediate the inwardly extending portions of said top and bottom members and said face member, said indicia carrying member including columns and rows of indicia, said columns of indicia being disposed in predetermined locations with respect to said rows of indicia and said columns and rows being disposed in predetermined relationship to the windows in said front face member.

5. The apparatus of claim 4 in which one of the windows in the front face member includes an indicia scale for a range of values for a first related variable and the columns of indicia on the card member include a range of indicia related to a computed value and are disposed to lie in registration with said window and another of the windows in the front face member is disposed in cooperating indicia disclosing relation to the rows of indicia on the card member corresponding to a range of values for a second related variable.

References Cited

UNITED STATES PATENTS

| | | | |
|---|---|---|---|
| 2,532,619 | 12/1950 | Heerich | 235—89 |
| 2,542,834 | 2/1951 | Peurozet | 235—89 |
| 2,614,751 | 10/1952 | Heinz | 235—89 |
| 2,689,685 | 9/1954 | Giuntini | 235—89 |
| 3,045,908 | 7/1962 | Donovan | 235—89 |
| 3,162,364 | 12/1964 | Ragland et al. | 235—89 |

RICHARD B. WILKINSON, *Primary Examiner,*

S. A. WAL, *Assistant Examiner,*